United States Patent
Durrant

(10) Patent No.: US 9,737,064 B2
(45) Date of Patent: Aug. 22, 2017

(54) FLY FISHING DEVICE

(71) Applicant: David P. Durrant, Hamilton, OH (US)

(72) Inventor: David P. Durrant, Hamilton, OH (US)

(73) Assignee: David P. Durrant, Hamilton, OH (US)

( * ) Notice: Subject to any disclaimer, the term of this patent is extended or adjusted under 35 U.S.C. 154(b) by 369 days.

(21) Appl. No.: 13/681,194

(22) Filed: Nov. 19, 2012

(65) Prior Publication Data
US 2014/0138892 A1    May 22, 2014

(51) Int. Cl.
*A01K 97/28* (2006.01)
*B25B 5/00* (2006.01)
*B25B 5/08* (2006.01)

(52) U.S. Cl.
CPC .............. *A01K 97/28* (2013.01); *B25B 5/006* (2013.01); *B25B 5/08* (2013.01)

(58) Field of Classification Search
CPC .. A01K 97/28; B25B 5/10; B25B 5/08; B25B 1/22
USPC ......... 269/71, 907, 69, 95, 97, 98, 166, 229, 269/234, 75, 86; 81/6, 7, 8
See application file for complete search history.

(56) References Cited

U.S. PATENT DOCUMENTS

| | | | | |
|---|---|---|---|---|
| 432,829 A * | 7/1890 | Hirst | ........................ | B25B 5/006 269/45 |
| 2,236,781 A * | 4/1941 | Pannier | .................. | A01K 97/28 269/223 |
| 2,486,142 A * | 10/1949 | Fong | ....................... | A01K 97/28 242/149 |
| 2,586,636 A * | 2/1952 | Fischer et al. | ..................... | 269/4 |
| 2,599,174 A * | 6/1952 | Hauser | .................... | A01K 97/28 269/221 |
| 4,039,178 A * | 8/1977 | Odames | .................. | A01K 97/28 269/236 |
| 4,134,577 A * | 1/1979 | Price | ....................... | A01K 97/28 269/101 |
| 4,169,562 A * | 10/1979 | Renzetti | .................. | A01K 97/28 242/446 |
| 4,214,739 A * | 7/1980 | Dailey | ........................ | B25B 1/22 269/75 |
| D263,113 S * | 2/1982 | Gehrke | ........................ | D22/149 |
| 4,969,636 A * | 11/1990 | Gautam | .................. | A01K 97/28 269/157 |
| 5,052,555 A * | 10/1991 | Harmon | .................... | 206/315.11 |
| 5,716,020 A * | 2/1998 | Shults | ..................... | A01K 97/28 242/443 |
| 5,826,867 A * | 10/1998 | Roby | ...................... | A01K 97/28 269/74 |
| 5,884,954 A * | 3/1999 | Trozera | ..................... | B25B 9/02 294/100 |
| 7,566,022 B1 * | 7/2009 | McKinley | .............. | A01K 97/28 242/443 |
| 8,146,263 B2 * | 4/2012 | Kipnes | ..................... | G01B 3/20 33/783 |

(Continued)

*Primary Examiner* — Monica Carter
*Assistant Examiner* — Seahee Yoon
(74) *Attorney, Agent, or Firm* — Schwegman Lundberg & Woessner, P.A.

(57) ABSTRACT

A fly fishing vice is provided. A fly vice for creating custom flies includes a cylindrical member that attaches to a vertical member, and the vertical member attaches to a base member. The members can be disassembled for transport. The cylindrical member includes integrated jaw members for holding flies. Moreover, the cylindrical member can be custom adjusted to a desired point in three-dimensional space.

12 Claims, 17 Drawing Sheets

(56) References Cited

U.S. PATENT DOCUMENTS

2009/0020933 A1* 1/2009 Su .................... A01K 97/28
269/71
2012/0103145 A1* 5/2012 Hixson .................... 81/418

* cited by examiner

FLY FISHING DEVICE

BACKGROUND

Fly fishing is a very popular outdoor sport. A fly fisherman often desires, and goes to great expense, to create his/her own custom flies.

The process of creating a fly includes affixing the fly to a vice and then stringing and weaving threads about the fly in desired patterns and colors. The vice has to be sturdy so as to have minimal movement, and the vice has to be able to hold the flies during the creation process.

One issue with fly vices is that they come as one-size fits all. That is, novice vices are designed to accommodate beginners, intermediate vices are designed for more advanced fly designers, and expert vices are designed for the most experienced fly designers. Fly vices are not cheap; so, as an individual develops more and more proficiency with creating his/her own flies, more and different fly vices are needed.

Another issue with fly vices is that they are ridged; that is they have only limited capabilities to adjust to the height and position that is optimal for the fisherman. Fishermen, like society, come in all shapes and sizes such that any given fisherman often struggles to find a table of just the right height to position a vice for optimal use by that fisherman. Furthermore, during vice use the fisherman may desire or need the fly to be positioned in a different position and in order to achieve such a scenario with conventional vices, the fisherman finds himself/herself moving around the vice rather than repositioning the vice itself. The means the entire area around the table having the vice has to be unobstructed.

Still another issue is that fly fishermen often travel to various locations in search of their perfect location to fly fish. They either leave their clumsy fly vices behind because of the difficulty packing and transporting the vices or they find a way to pack and travel with their vices. Neither situation is an optimal situation with the fly fisherman.

SUMMARY

In various embodiments, a fly fishing vice is presented.

Specifically, a fly fishing vice is provided that includes a cylindrical member adapted to attach to a vertical member and further adapted to be independently adjusted in 360 degrees for both a vertical direction and a horizontal direction. The cylindrical member further adapted to hold flies being customized for fly fishing.

BRIEF DESCRIPTION OF THE DRAWINGS

FIGS. 2A-2M are diagrams of each component of the fly vice of the FIGS. 1A-1C, according to an example embodiment.

DETAILED DESCRIPTION

Figure 1A:
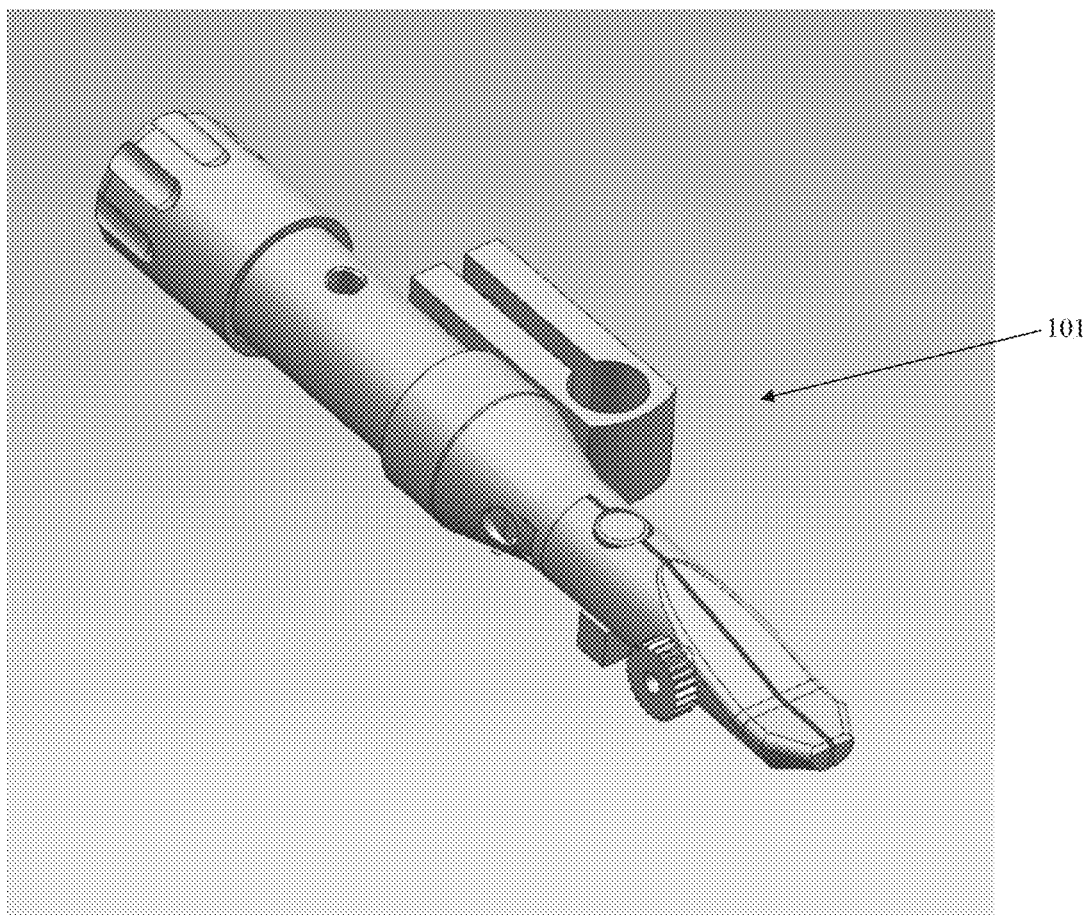
FIGS. 1A-1C are diagrams of a fly vice and components of that fly vice, according to an example embodiment.
Figure 1B:
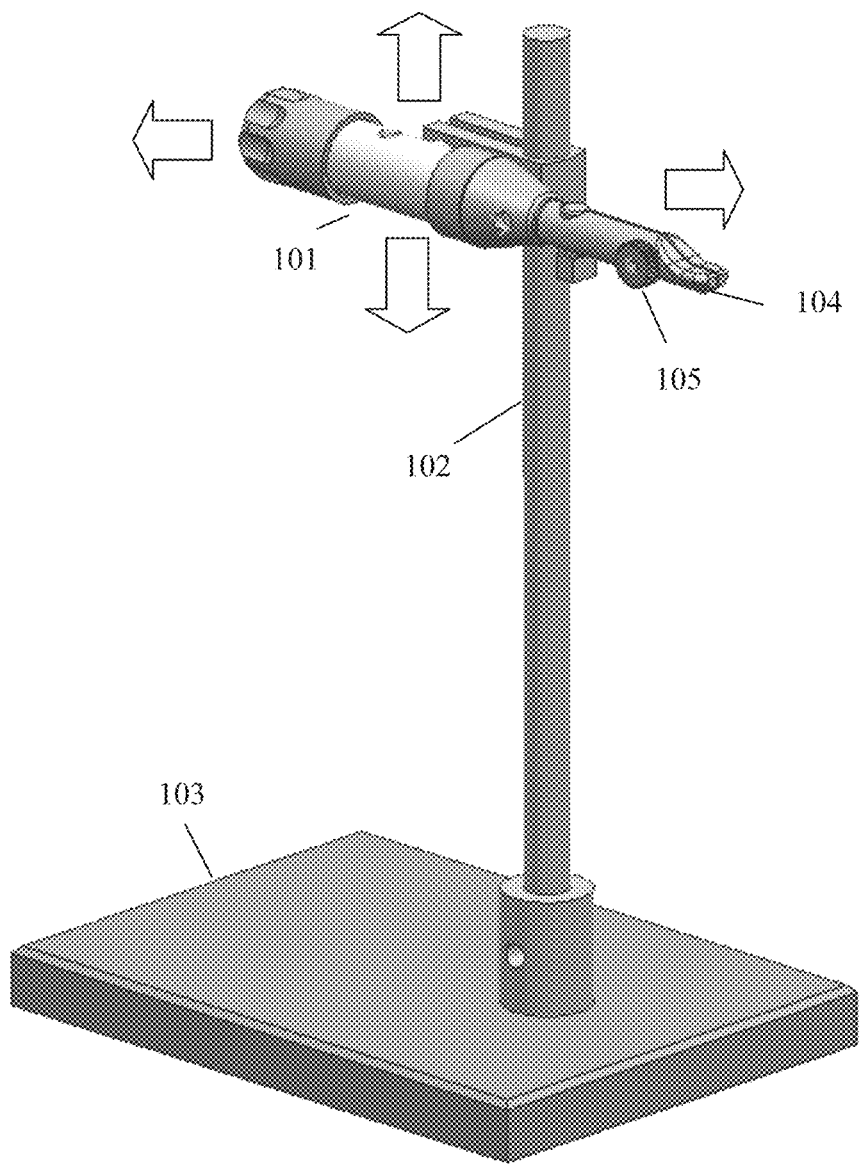
Figure 1C:
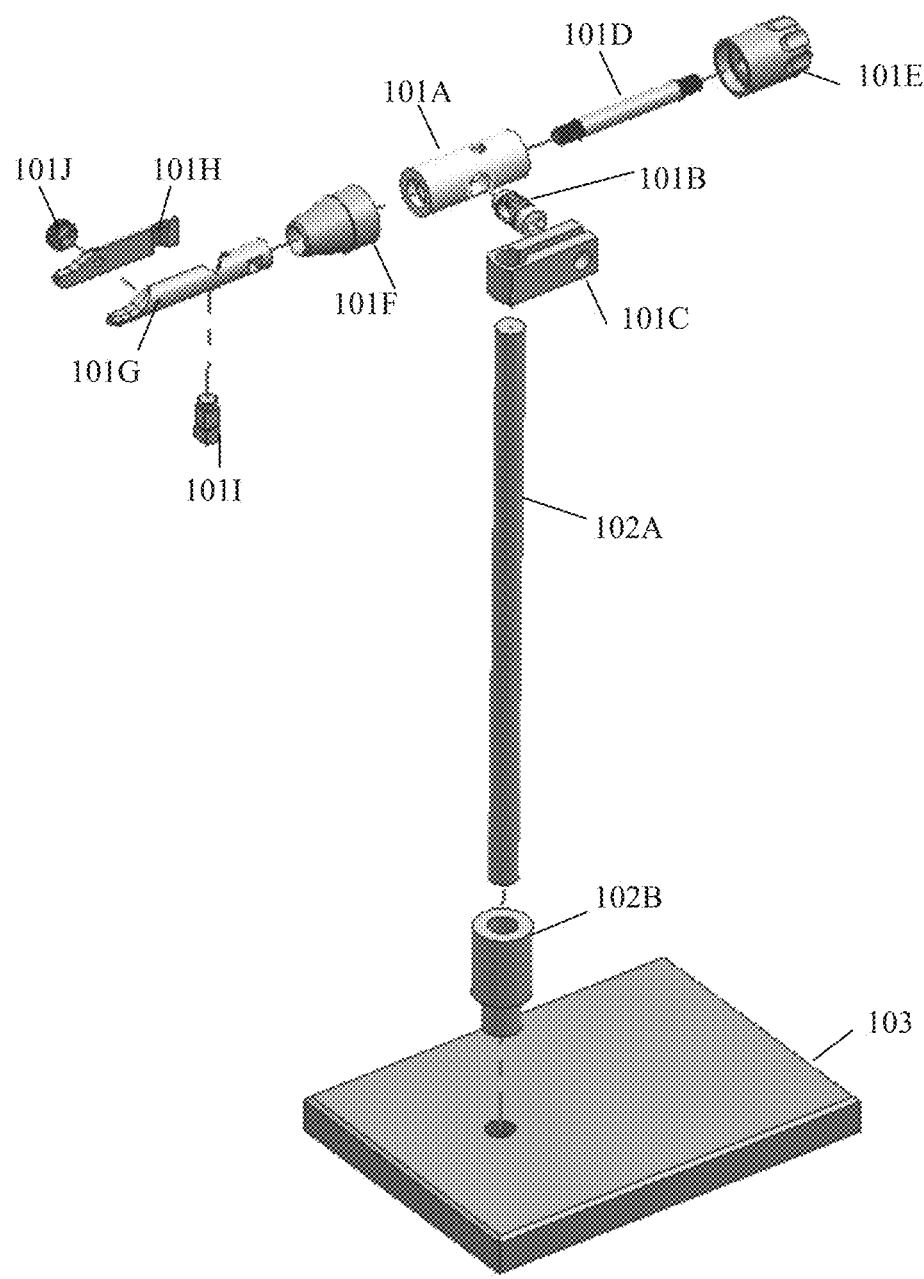

FIGS. 1A-1C are diagrams of a fly vice and components of that fly vice, according to an example embodiment.

The FIG. 1A is a view of a cylindrical member (101 in the FIG. 1B) for a fly vice. The cylindrical member 101 is adapted to be independently adjusted in 360 degrees for both a vertical direction and a horizontal direction (as shown via the arrows in the FIG. 1B). In fact, the cylindrical member is adapted to be custom positioned and fix ably held for any point in three-dimensional space (along three axis, such as x (length), y (height), and z (width)).

Figure 2A:
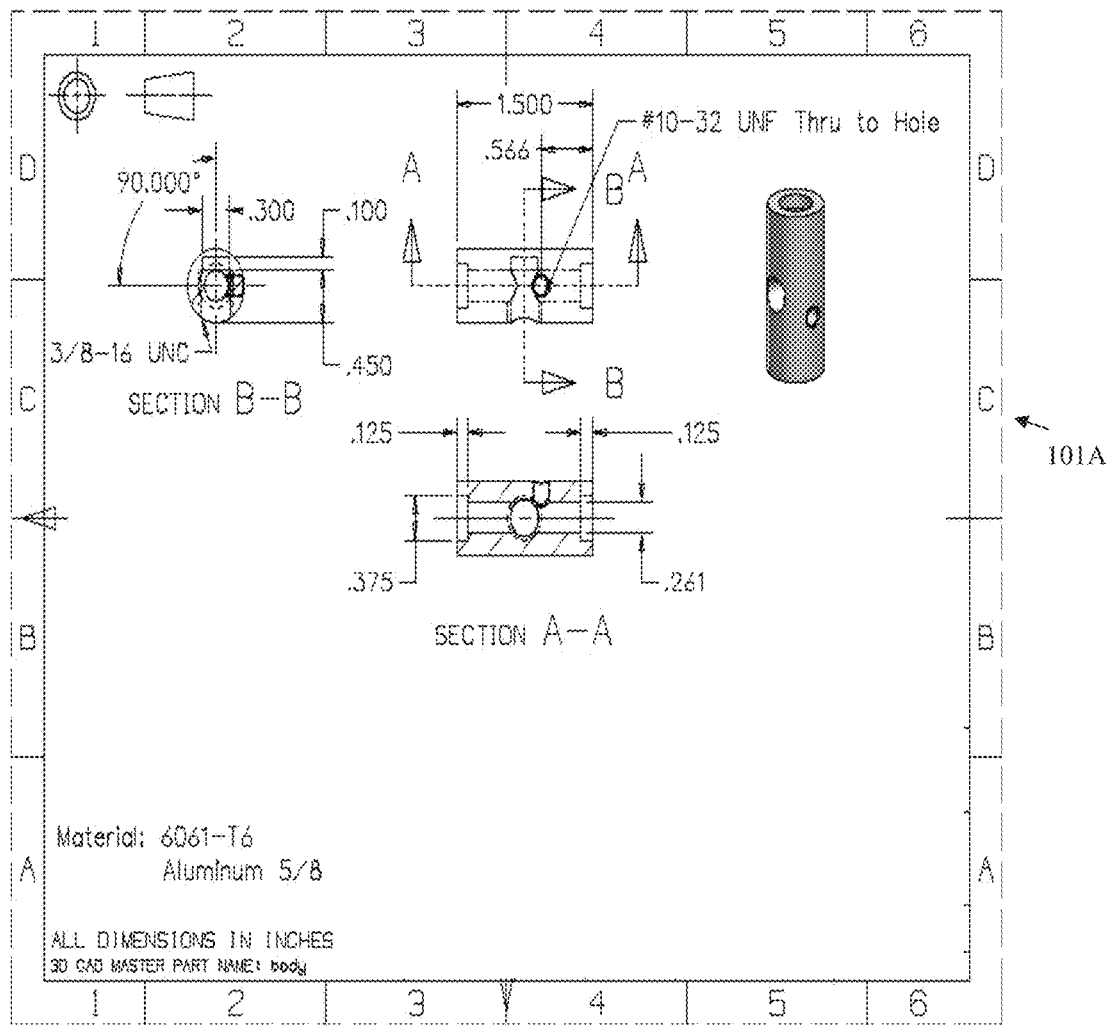
Figure 2B:
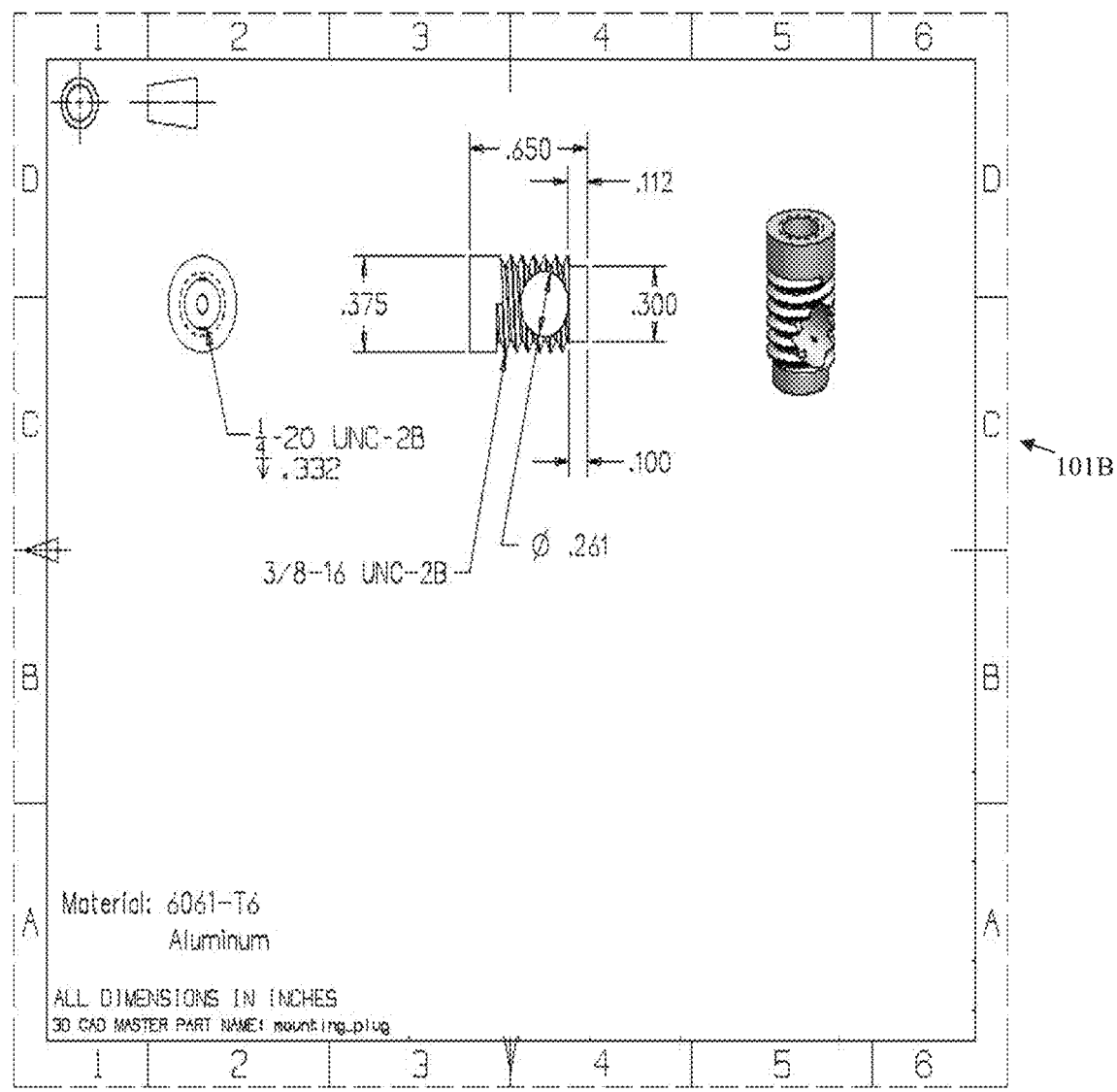
Figure 2C:
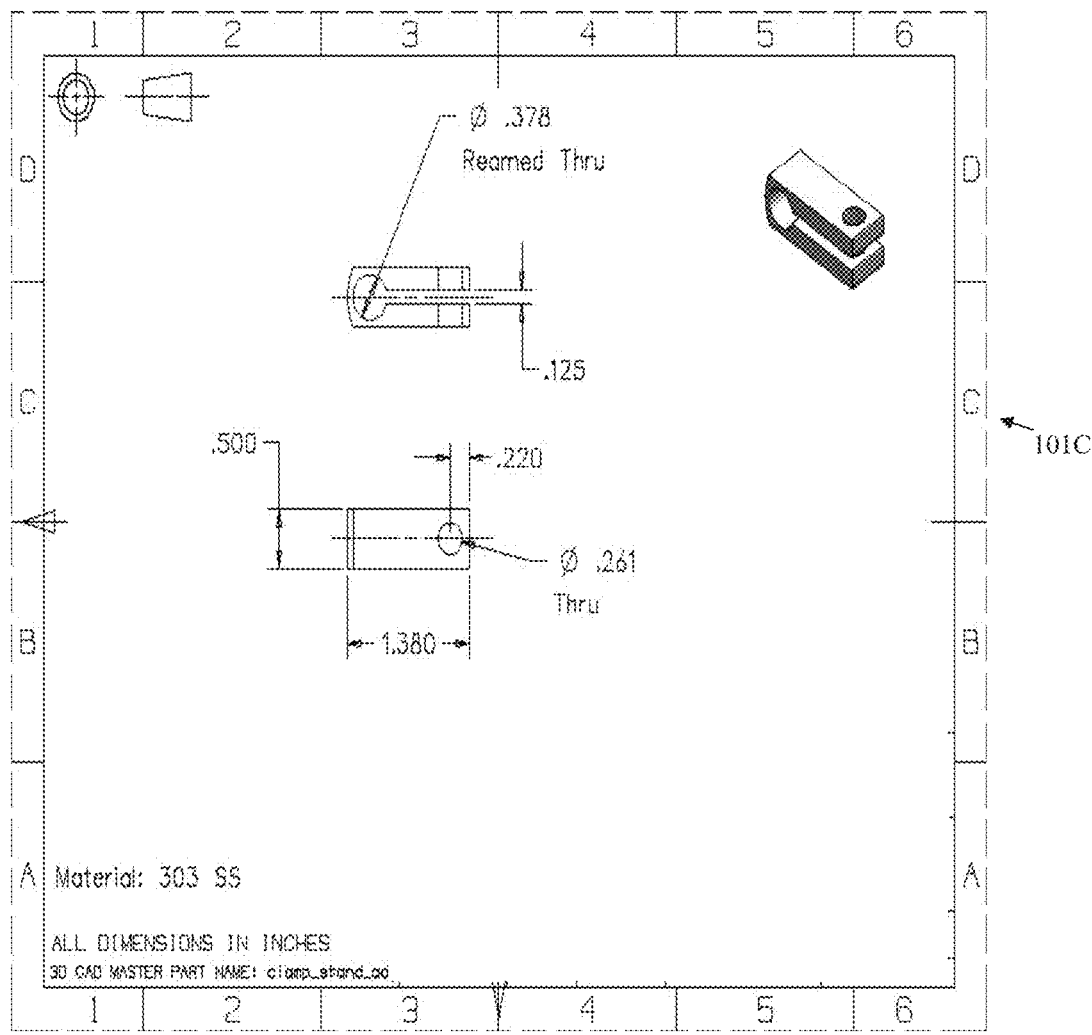
Figure 2D:
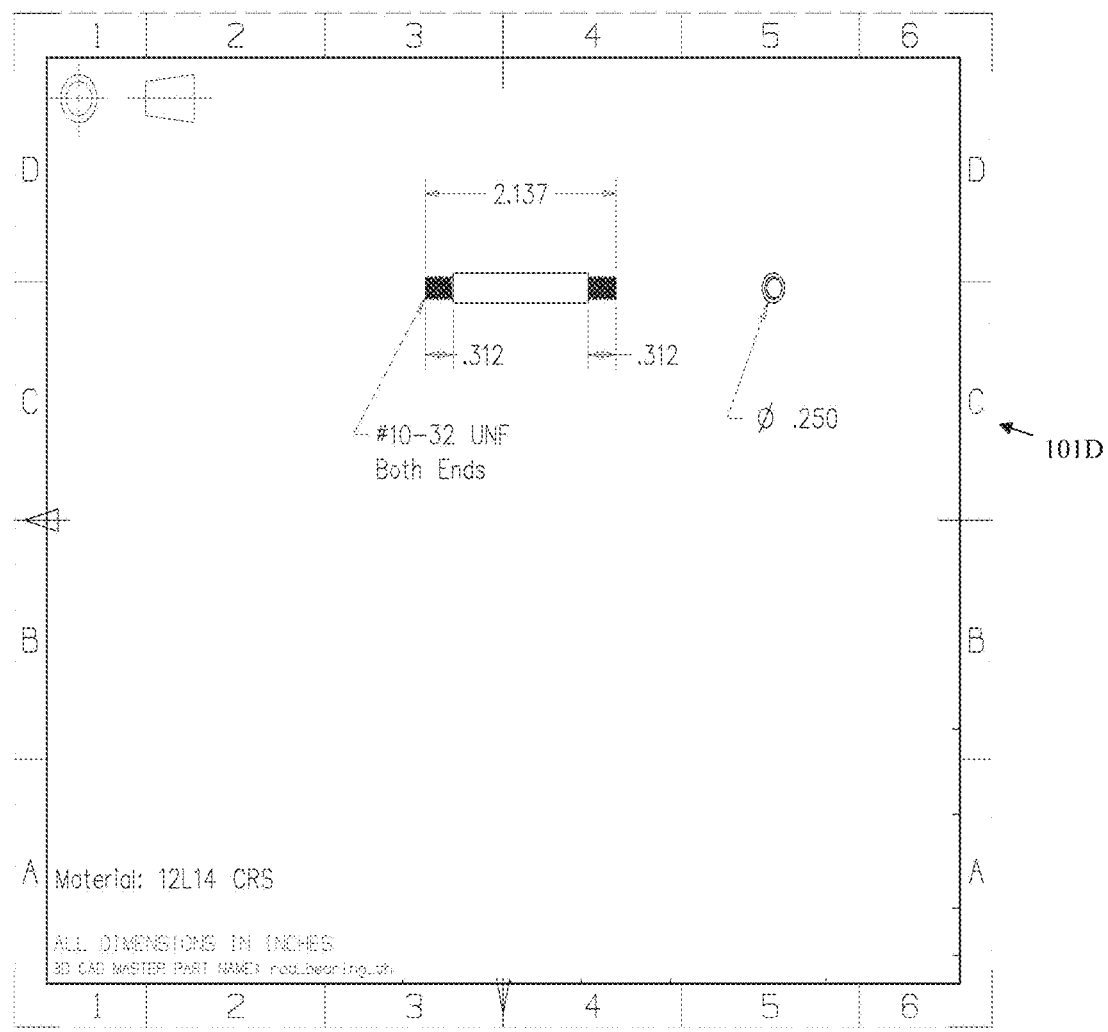
Figure 2E:
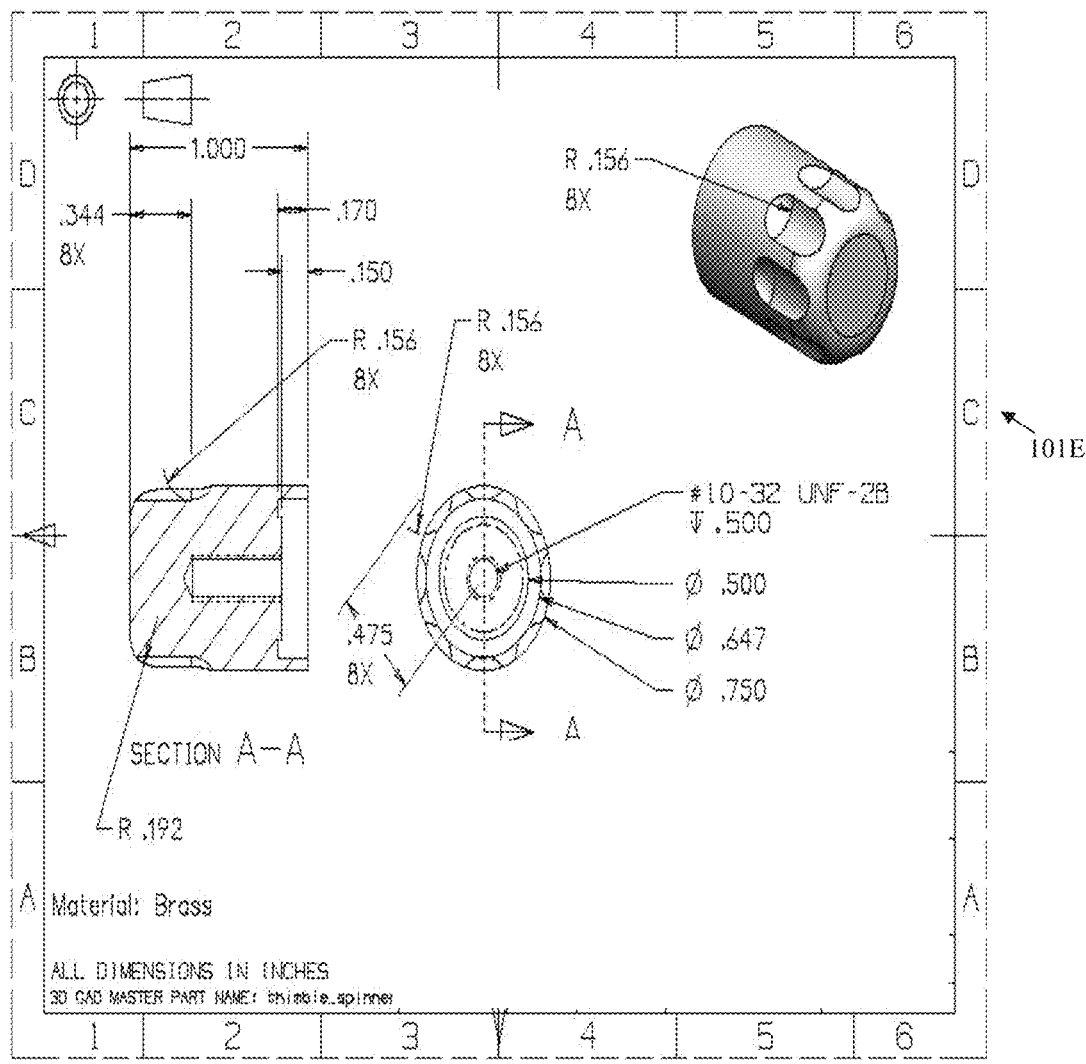
Figure 2F:
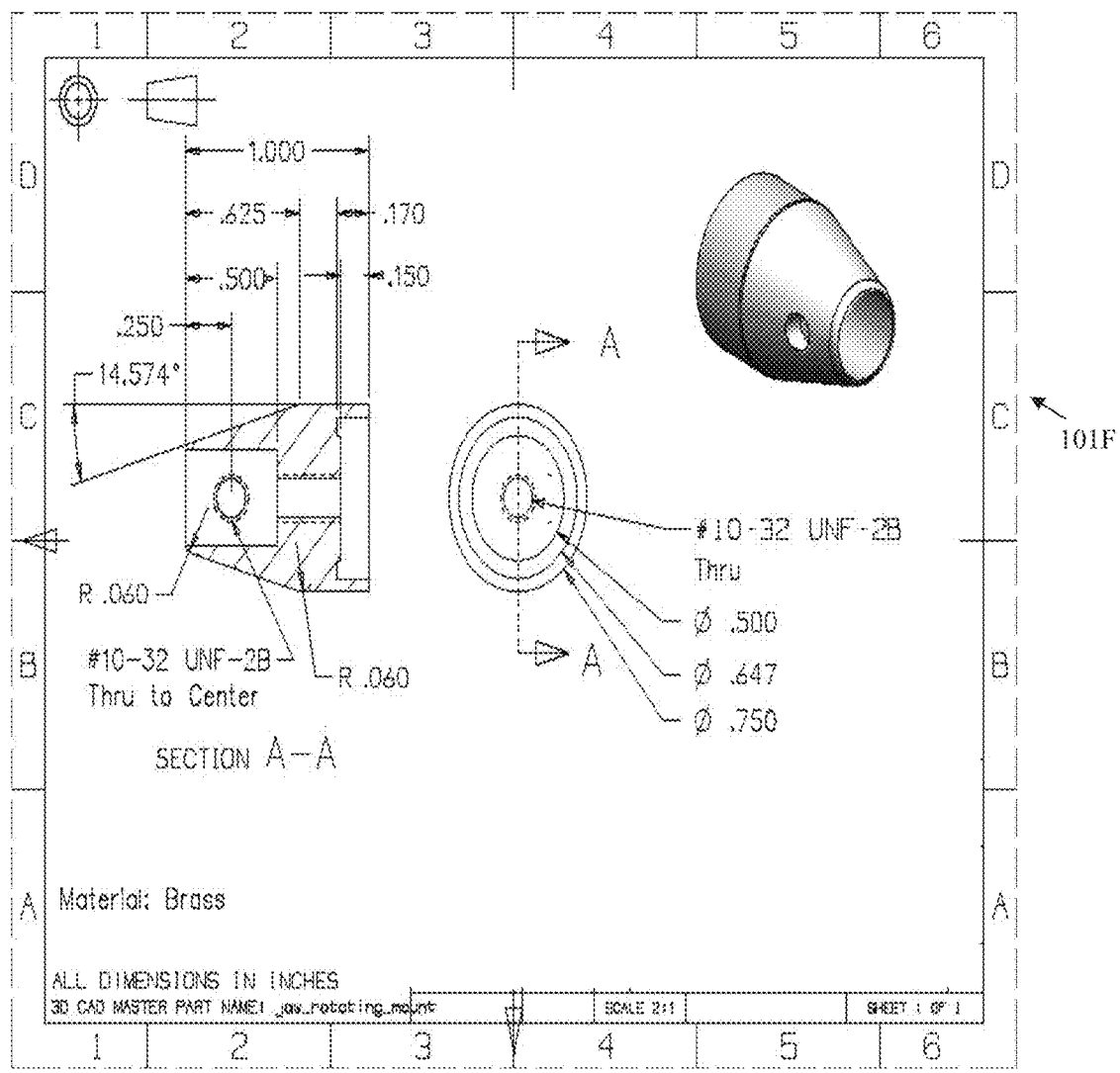
Figure 2G:
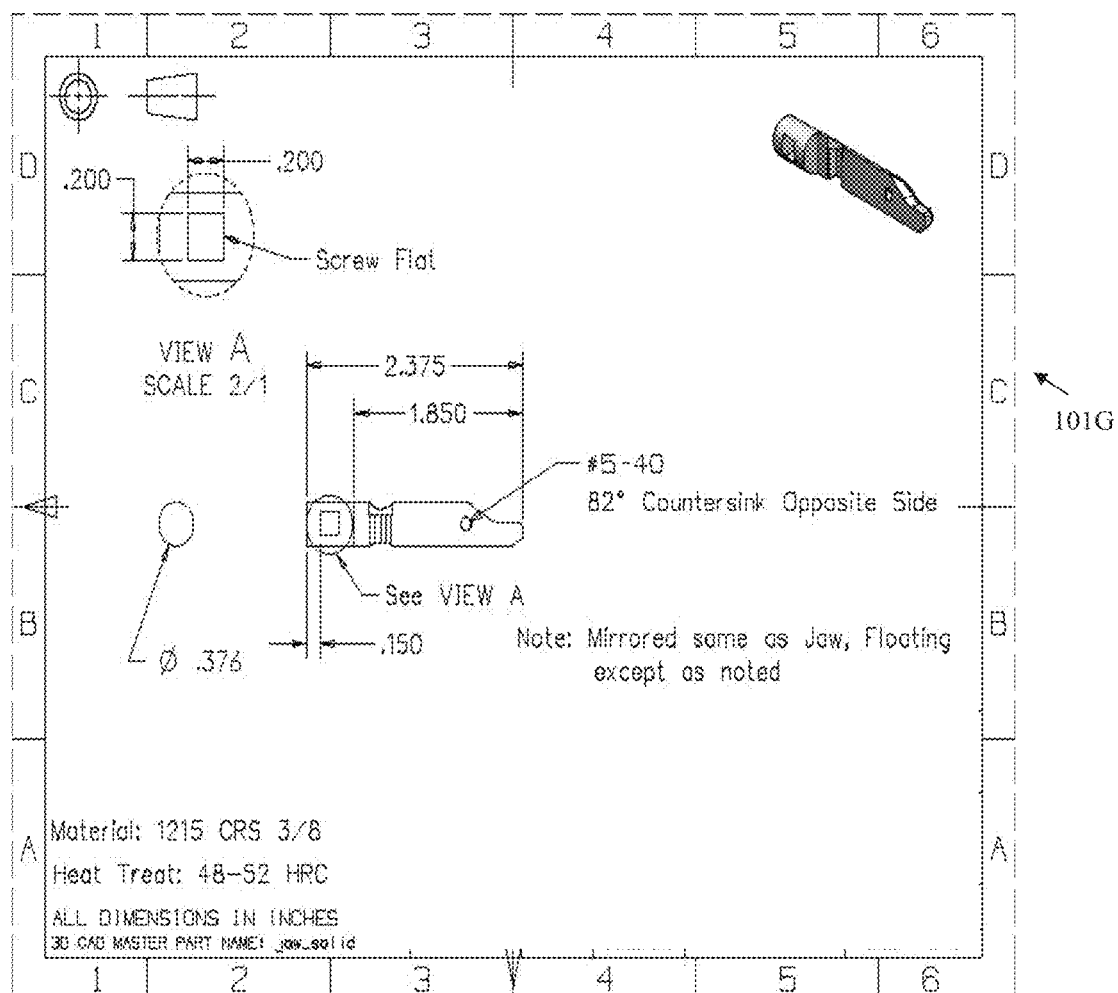
Figure 2H:
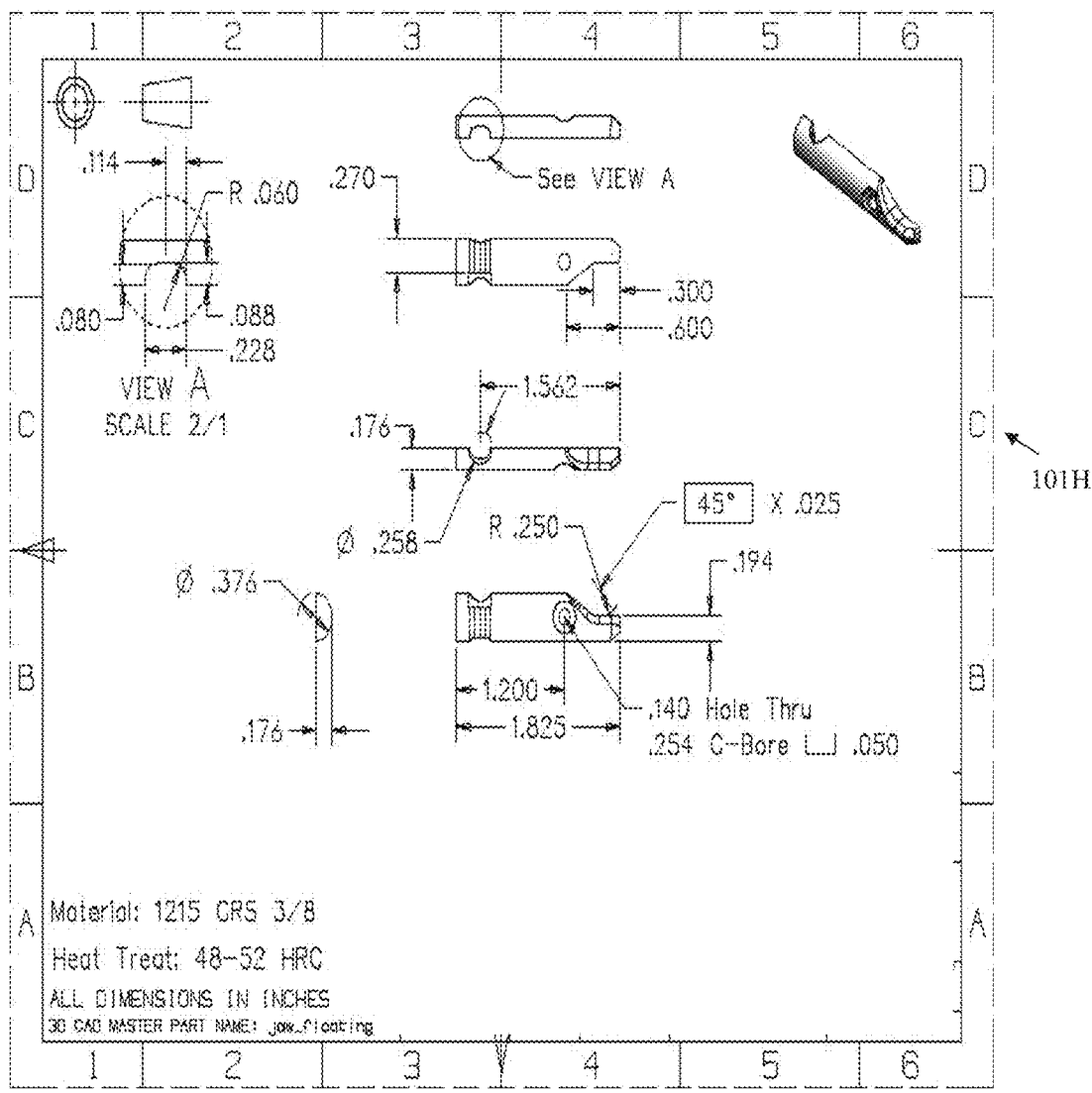
Figure 21:
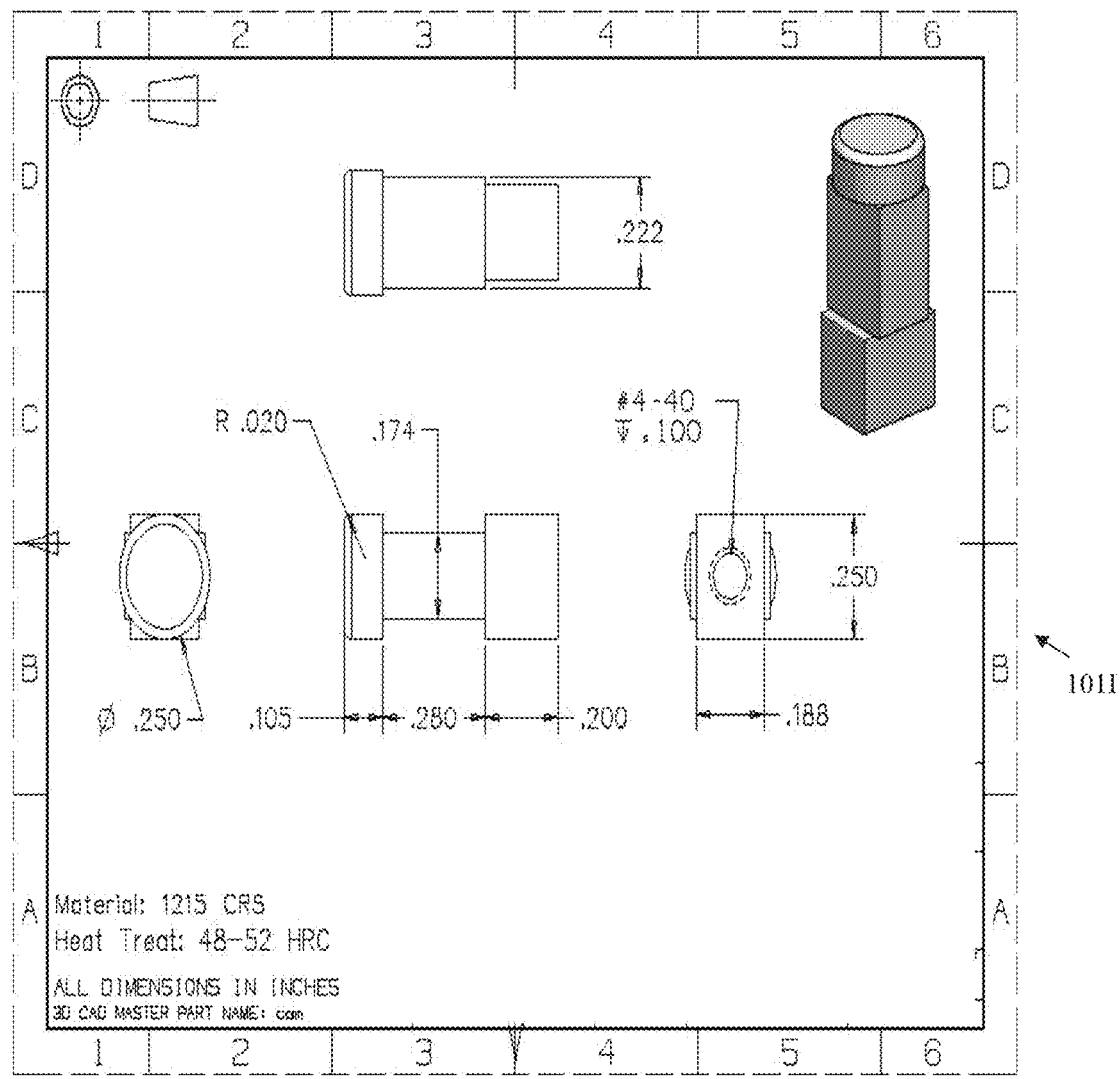
Figure 2J:
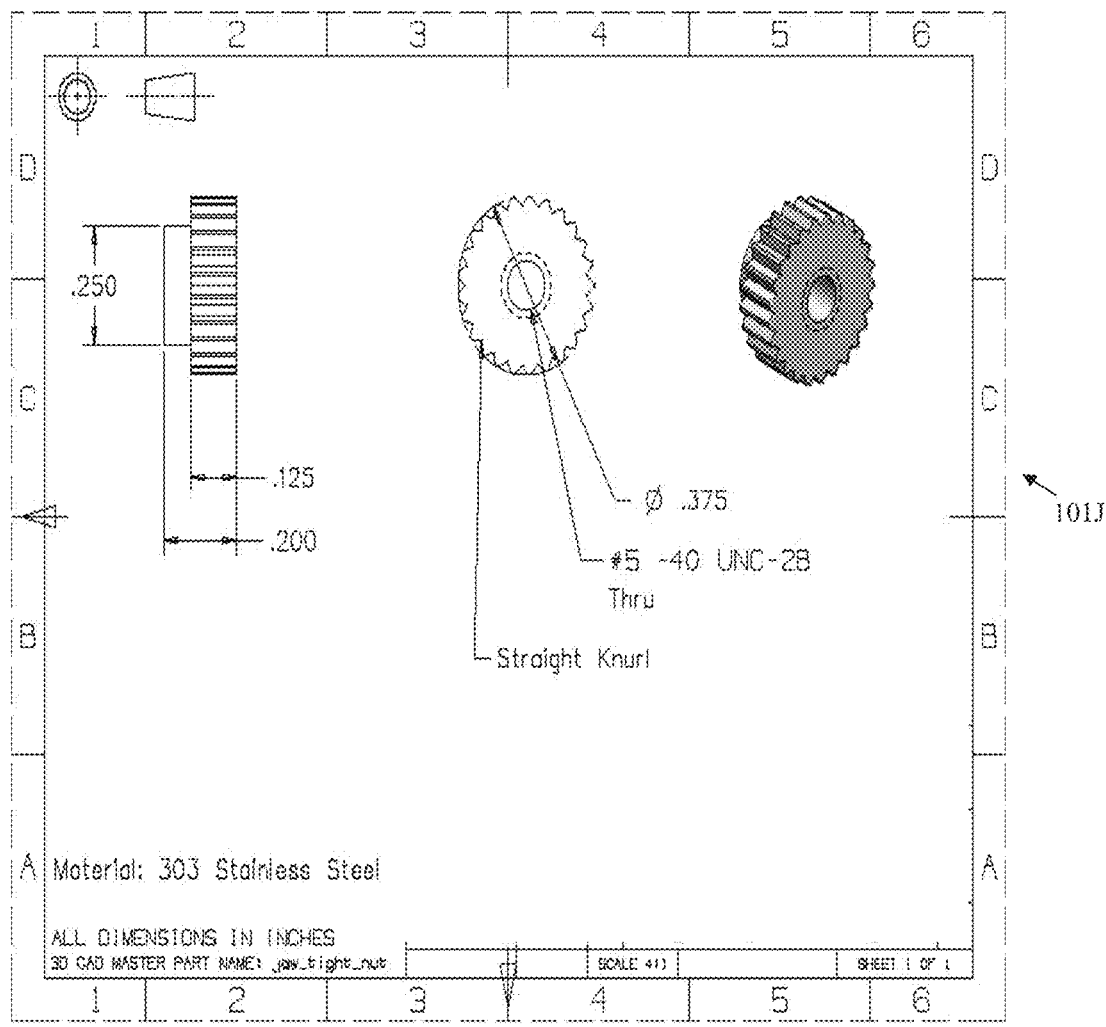
Figure 2K:
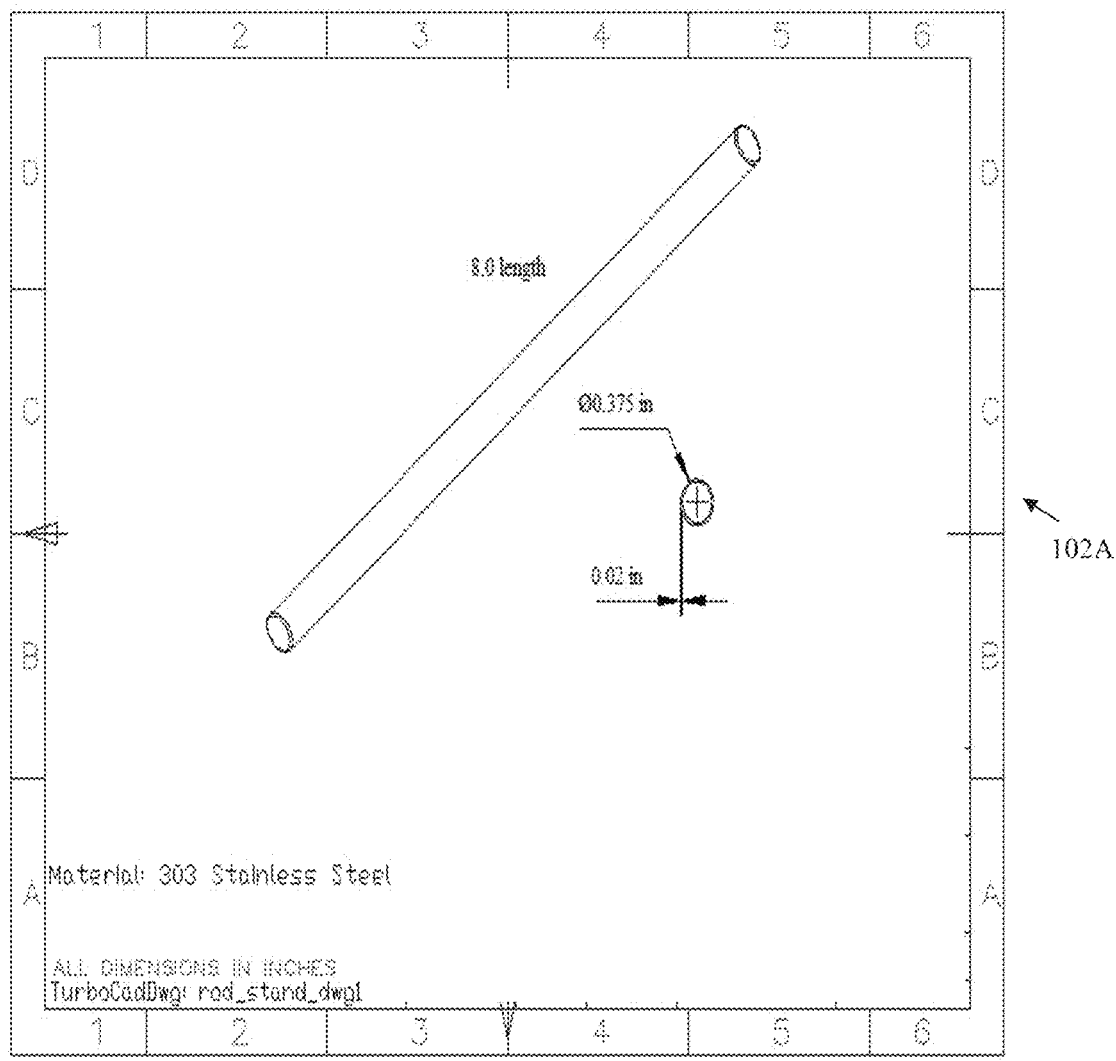
Figure 2L:
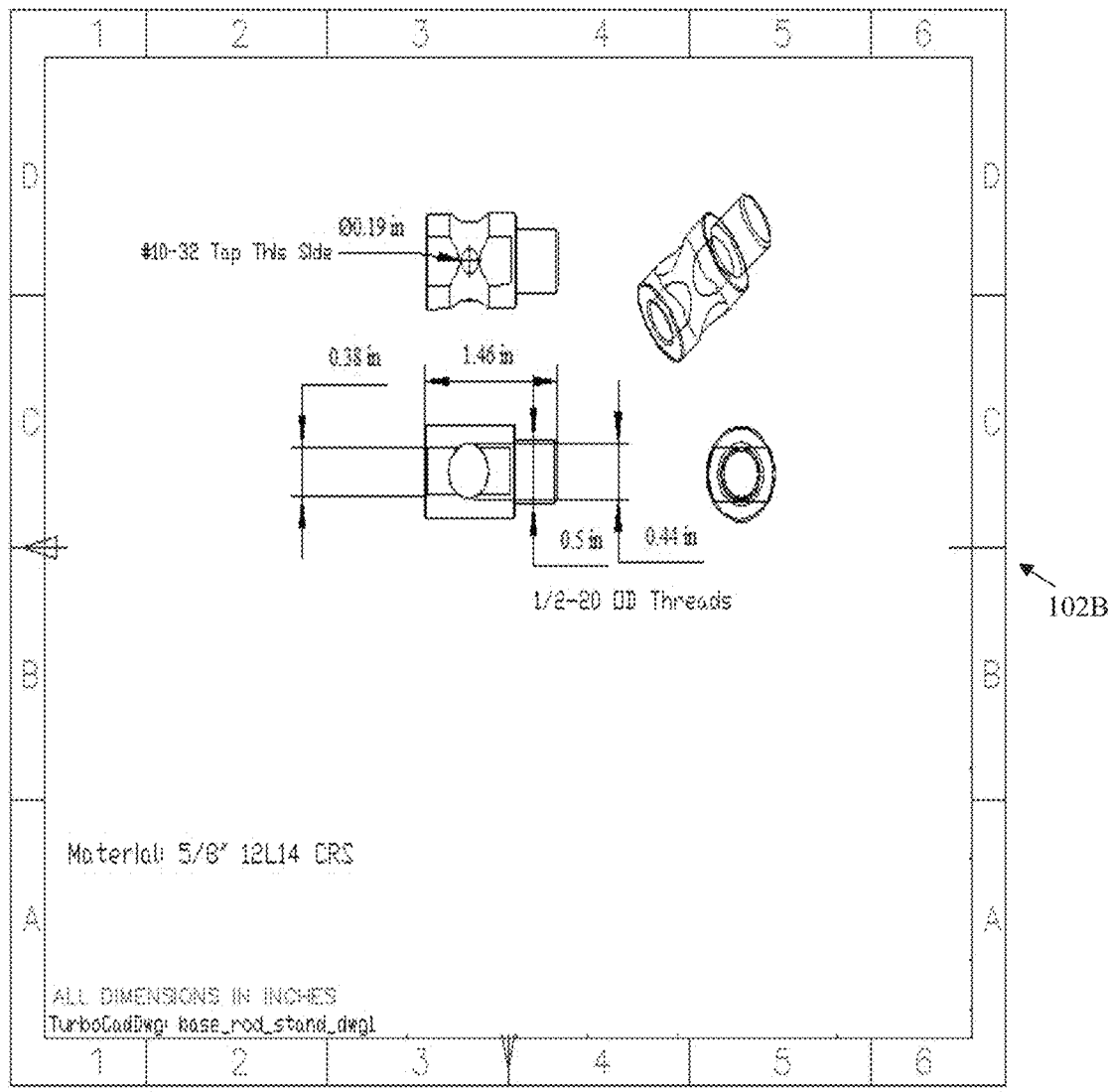

Specifically, a clamp stand adjustment (identified as 101C in the FIG. 1C and detailed in the FIG. 2C) provides a mechanism to adjust the cylindrical member 101 (FIG. 1B) in a vertical direction and also in a horizontal direction on a vertical component (vertical rod 102 in the FIGS. 1B; 102A and 102B in the FIG. 1C; and FIGS. 2K and 2L).

It is also noted that different angled positions of the cylindrical member 101 can be achieved at any given selected vertical and horizontal position. This is achieved via the body shaft 101A (FIG. 1C and further detailed in the FIG. 2A) using a mounting plug 101B (FIG. 1C and further detailed in the FIG. 2B) that attaches to the clamp stand adjustment 101C (FIG. 2C) and the body 101A (FIG. 2A) of the cylindrical member 101. The clamp stand adjustment 101C combined with the mounting plug 101B and the body shaft 101A provides a single locking mechanism for adjusting the cylindrical member 101 in a custom position in three-dimensions. It is noted that a dual locking mechanism can be used; for example, the clamp stand adjustment 101C and provide custom positioning while another locking mechanism can be used to angle the cylindrical member 101 (adjust up and down at a particular location). So, in some cases a dual locking mechanism can be used (not shown in the FIGS.).

So, the cylindrical member 101 is adapted to attach to the vertical member 102. It is also noted that the entire cylindrical member 101 (also see FIG. 1A) is also adapted to be removed from the vertical member 102 to provide disassembly of the fly vice (FIG. 1B).

In some embodiments, the cylindrical member 101 also includes a dual threaded rod bearing 101D (FIG. 1C and detailed in the FIG. 2D) that screws into or attaches the body 101A and attaches a thimble spinner 101E (FIG. 1C and detailed in the FIG. 2E). The front portion of the body 101A of the cylindrical member 101 attaches to a jaw rotating mount 101F (FIG. 1C and detailed in the FIG. 2F).

The cylindrical member 101 also includes integrated jaw members 101G and 101H (FIG. 1C and detailed in the FIGS. 2G and 2H—the jaw members are also shown as 104 in the FIG. 1B). The jaw members 101G and 101H permit the cylindrical member 101 to fix ably hold flies being customized for fly fishing by a fly fisherman. The cylindrical members 101G and 101H are adapted to attach to one another and be held in the jaw rotating mount 101F. The jaw members 101G and 101H include a cam 101I (FIG. 1C and detailed in the FIG. 2I) and a tightening nut 101J (FIG. 1C and detailed in the FIG. 2J—the tightening nut is also shown as 105 in the FIG. 1B). The jaw members 101G and 101H are adapted to hold a fly is a custom position between the jaw members 101G and 101H using the tightening nut 101J. The angle and vertical and horizontal position of the jaw members 101G and 101H (and therefore the fly being worked on by a fisherman) is adjusted via the body 101A, the mounting plug 101B and the clamp stand adjustment 101C.

The entire cylindrical member 101 can be flipped 180 degrees from what is shown in the FIGS. 1B and 1C such that the jaw members 101G and 101H are pointing in an opposite direction from where they originated. This permits the jaw members 101G and 101H of the cylindrical member 101 to be positioned for a right-handed fisherman or a left-handed fisherman. There a no conventional fly vices that permit adjustment for left-handed fisherman; but such a configuration is easily achieved with the fly vice (FIG. 1B) presented herein.

Moreover, in an embodiment the jaw members 101G and 101H are made of hardened steel so as to ensure they do not chip, break, etc. during fly creation.

Figure 2M:
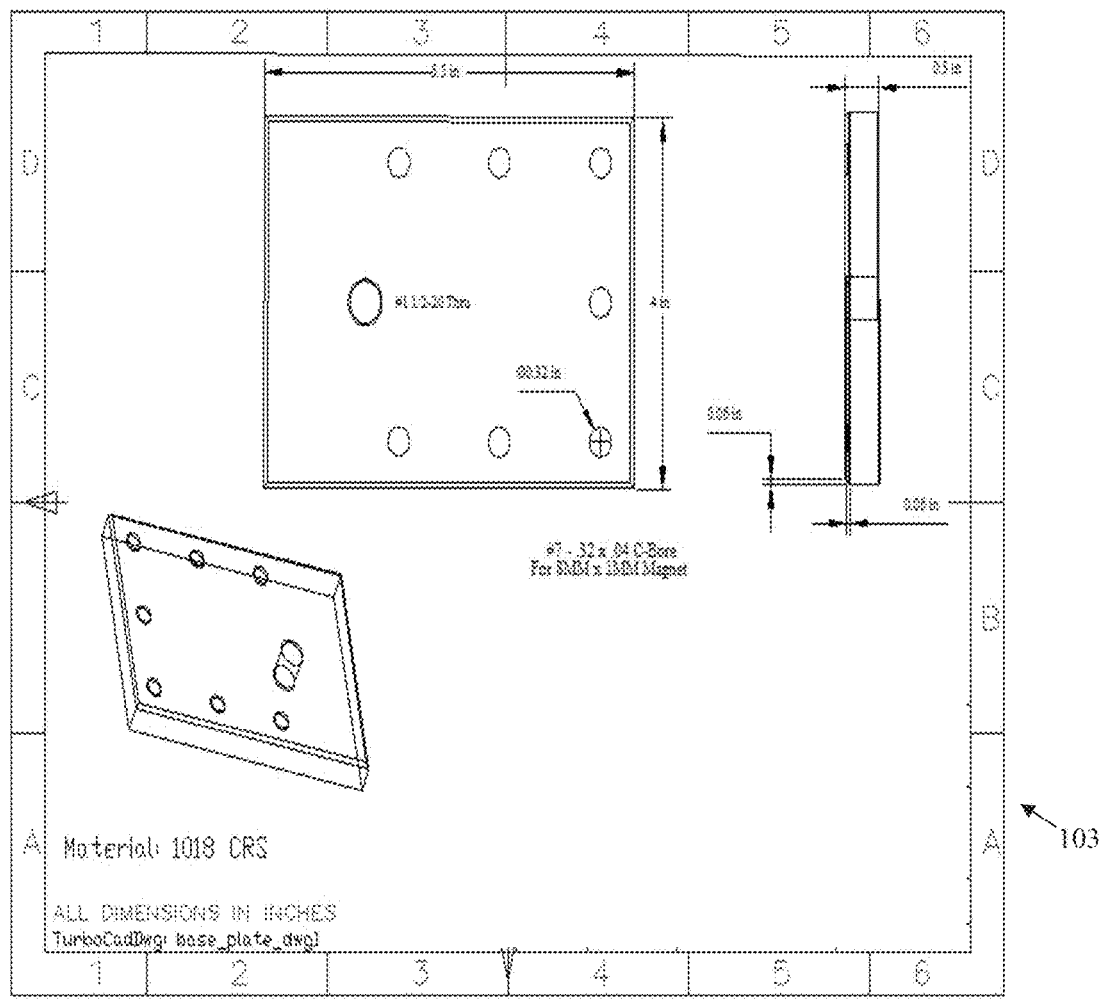

The fly vice (FIG. 1B) also includes a base member 103 (FIGS. 1B-1C and detailed in the FIG. 2M). The base member 103 is adapted to receive and hold the vertical member 102A and 102B. It is noted that the vertical member 102A and 102B is also capable of being disassembled from the base member 103. The base member 103 is adapted to hold the vertical member 102 at an angle that is perpendicular to the base member 103.

In an embodiment, the base member 103 is magnetized. This can be achieved in a variety of manners. For example, the base member 103 can be dipped or painted with magnetic paint or liquid. In another case, the base member 103 includes applied magnetic tape or affixed magnets. In still another case, the base member 103 may itself be a magnet or manufactured as one or a material that is magnetized during manufacture of the base member 103. So, the base member 103 can be magnetized post manufacture or during manufacture. A magnetic base member 103 permits the base member 103 to catch and hold any flies that drop from the jaw members 101G and 101H. One of ordinary skill in the art appreciates that the flies are small and often drop when not properly tightened and end up bouncing off a base of a vice and get lost or cause great inconvenience for the fisherman. So, by having a base member 103 that is magnetized to catch drop flies the fisherman can quickly and easily locate and retrieve any dropped flies.

Continuing with the previous embodiment and in some other situations, the vertical member 102A and 102B is made of a nonferrous material so as to prevent magnetic properties on the vertical member 102A and 102B; this prevents the flies while being held in the jaw members 101G and 101H from being pulled toward the vertical member 102A during fly creation and customization.

In an embodiment, the fly vice (FIG. 1B) is adapted to be quickly assembled and disassembled by a fisherman into a minimum of three component pieces the cylindrical member 101, the vertical member 102 (FIG. 1B), and the base member 103. In an embodiment, a case is also provided to custom fit these components (101, 102, and 103). This permits a fisherman to quickly assembled and disassemble the entire fly vice (FIG. 1B) for transport, which heretofore has been difficult and clumsy to say the least with conventional rigid fly vices.

Figure 3:
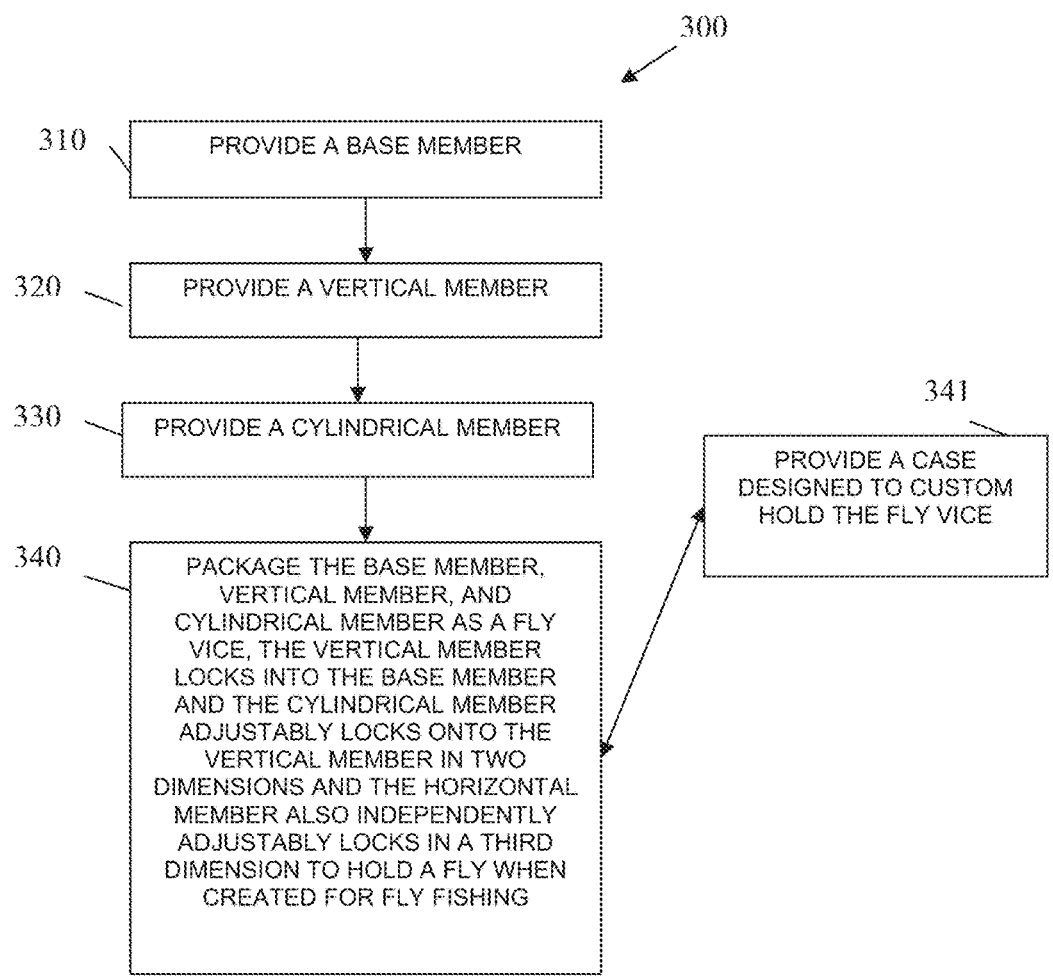
FIG. 3 is a diagram of a method for packaging the fly vice of the FIGS. 1A-1C, according to an example embodiment.

FIG. 3 is a diagram of a method 300 for packaging the fly vice of the FIGS. 1A-1C, according to an example embodiment. The method 300 (hereinafter "distribution process") can be in whole or in part implemented using machinery for mass producing, packaging, and distributing the components of the fly vice (FIGS. 1B-1C).

At 310, the distribution process provides a base member 103.

At 320, the distribution process provides a vertical member 102.

At 330, the distribution process provides a cylindrical member 103.

At 340, the distribution process packages the base member 103, the vertical member 102, and the cylindrical member 101 as three separate components that comprise the fly vice (FIGS. 1B-1C). The vertical member 102 locks into the base member 103 and the cylindrical member 101 adjustably locks into the vertical member 102 in two dimensions and the cylindrical member 101 also independently adjustably locks in a third dimension for purposes of holding a fly being created for fly fishing.

According to an embodiment, the cylindrical member 101, the vertical member 102, and the base member 103 are packaged in a case that includes a custom fit for each of the members (101-103). The case designed, assembled, and/or manufactured to custom hold the members 101-103 of the fly vice (FIGS. 1B-1C).

It is noted that the various components of the fly vice presented herein can vary and that the FIGS. 2A-2M are presented for purposes of illustration and comprehension as more or less components can different configurations of those components can be used without departing from the core teachings presented herein and above. Thus, the specific materials and configurations are presented as some specific embodiments but other embodiments are capable as well.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A fly-fishing vice, comprising:
 a cylindrical member adapted to attach to a vertical member and further adapted to be independently adjusted in 360 degrees for both a vertical direction and a horizontal direction, the cylindrical member includes jaw members, and cylindrical member attachable and detachable from the vertical member through a clamp stand adjustment member, the jaw members are adapted to hold flies being customized for fly fishing between the jaw members; and
 the clamp stand adjustment member attached to the cylindrical member and the vertical member, the clamp stand adjustment member further adapted to attach perpendicular to the vertical member and the clamp stand adjustment member adapted to adjust the cylindrical member at custom positions along the vertical member in the vertical direction and the horizontal direction, and wherein cylindrical member including a body shaft having a single locking mechanism to adjust the cylindrical member having the jaw members in custom positions in three dimensions while the clamp stand adjustment member is attached to the cylindrical member and the vertical member and the single locking mechanism providing attachment of the clamp stand adjustment member to the vertical member.

2. The fly-fishing vice of claim 1 further comprising, a base member adapted to hold the vertical member.

3. The fly-fishing vice of claim 2, wherein the base member is magnetized.

4. The fly-fishing vice of claim 3, wherein the vertical member is a nonferrous material.

5. The fly-fishing vice of claim 2, wherein the cylindrical member, the vertical member, and the base member are adapted to be assembled for fly creation and disassembled for transport.

6. The fly-fishing vice of claim 1, wherein the cylindrical member is adapted to be flipped 180 degrees to position the jaw members for a left handed or right handed person customizing the flies through adjustment to the cam.

7. The fly-fishing vice of claim 6, wherein the jaw embers are made of hardened steel.

8. An apparatus, comprising:
   jaw members integrated into a cylindrical member, the jaw members are adapted to hold a fly in a custom position between the jaw members;
   the cylindrical member adapted to be custom positioned in a fixed position for a point in three-dimensional space, wherein the fly is customized in the custom position of the jaw members at the point, and wherein the cylindrical member including a body shaft having a single locking mechanism for attaching the cylindrical member to a clamp stand adjustment member; and
   the clamp stand adjustment member attached to the cylindrical member and a vertical member through the single locking mechanism on the body shaft of the cylindrical member, the clamp stand adjustment member also adapted to attach perpendicular to the vertical member by the single locking mechanism, and the clamp stand adjustment member further adapted to adjust the cylindrical member at custom positions along the vertical member in both horizontal and vertical directions and in three dimensions by the single locking mechanism, and wherein the clamp stand adjustment member also adapted to be removable and detachable from the vertical member by the single locking mechanism.

9. The apparatus of claim 8 further comprising, the vertical member adapted to hold the cylindrical member in desired vertical and horizontal positions.

10. The apparatus of claim 9 further comprising, a base member adapted to hold the vertical member perpendicular to the base member.

11. The apparatus of claim 10, wherein the base member is magnetized by:
    dipping the base member in magnetic paint, applying magnetic tape to the base member, affixing magnets to the base member, or manufacturing the base member as a magnet.

12. A method of packaging a fly vice for custom fly creation in fly fishing, comprising:
    providing a base member;
    providing a vertical member;
    providing a cylindrical member that includes jaw members and a body shaft that includes a single locking mechanism, wherein the jaw members are adapted to hold flies being customized for fly fishing between the jaw members by tightening the nut to hold a fly and moving the held fly to a desired angle through the cam;
    providing a clamp stand adjustment member; and
    packaging the base member, the vertical member; the cylindrical member, and the clamp stand adjustment member together as the fly vice, the vertical member locks into the base member and the cylindrical member adjustably locks onto the vertical member in two dimensions through the clamp stand adjustment member that custom vertically and horizontally moves up, down, and side to side along the vertical member while the clamp stand adjustment member remains in a perpendicular orientation with respect to the vertical member, and the clamp stand adjustment member affixes to the cylindrical member at the body shaft through the single locking mechanism, and the cylindrical member also independently adjustably locks in a third dimension to hold a particular fly when being created for the fly fishing on the clamp stand adjustment member through the single locking mechanism, and wherein the clamp stand adjustment member is removable and detachable from the vertical member by the single locking mechanism.

* * * * *

UNITED STATES PATENT AND TRADEMARK OFFICE
CERTIFICATE OF CORRECTION

PATENT NO. : 9,737,064 B2  
APPLICATION NO. : 13/681194  
DATED : August 22, 2017  
INVENTOR(S) : David P. Durrant Page 1 of 1

It is certified that error appears in the above-identified patent and that said Letters Patent is hereby corrected as shown below:

In the Claims

In Column 5, Line 15, in Claim 7, delete "embers" and insert --members-- therefor In Column 6, Line 23, in Claim 12, delete "member;" and insert --member,-- therefor Signed and Sealed this
Twenty-eighth Day of May, 2019

Andrei Iancu
*Director of the United States Patent and Trademark Office*